United States Patent Office 2,696,482
Patented Dec. 7, 1954

2,696,482

TRANSPARENT SYNTHETIC LINEAR POLYAMIDE AND PROCESS FOR PRODUCING SAME

Donald C. Pease, Wilmington, Del., assignor to E. I. du Pont de Nemours and Company, Wilmington, Del., a corporation of Delaware No Drawing. Application July 19, 1951,
Serial No. 237,678

3 Claims. (Cl. 260—78)

This invention relates to synthetic linear polyamides and more particularly to a synthetic linear polyamide of the nylon type which is characterized by its transparency, thermoplasticity, and its high dimensional stability at elevated temperatures.

Synthetic linear polyamides have achieved considerable importance as fibers for use in textiles. Copolyamides prepared from mixtures of different diamines and/or of different dibasic acids, for example that from hexamethylenediamine, adipic acid, and sebacic acid, are known to be more transparent and to have a wider and lower softening range than a polyamide prepared from a diamine and a dibasic acid. Special quench methods or additives are necessary with most copolyamides to obtain clear products, particularly in the form of moldings as contrasted to the fibers. Although polyamides generally have high melting points, for example 160–240° C., molded objects begin to lose their rigidity at temperatures of the order of 100–125° C.

Transparent polyamides suitable for molding into products of high strength and dimensional stability have been provided by the process of U. S. 2,512,606, wherein a normally liquid isomer mixture of bis(4-aminocyclohexyl)methane, equally correctly termed di(p-aminocyclohexyl)methane,

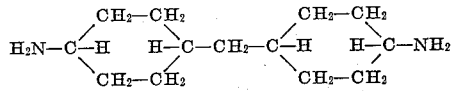

is reacted with a straight chain alpha, omega-alkanedioic acid of 6–10 carbons. These polyamides are transparent and moldable, but they are, in general, not dimensionally stable at temperatures above 100° C. and lose their strength at high temperatures, e. g., 200° C. or higher.

There has now been found a new polyamide having the recurring unit,

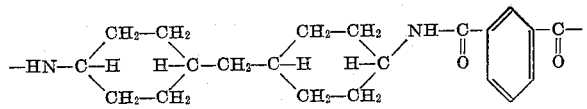

which is transparent, thermoplastic, unaffected by boiling water, and whose molded objects retain their dimensions and high strength at temperatures of 200° C. or higher. The polyamides of this invention are obtained by the reaction of substantially equimolecular amounts (i. e., within 0.5%) of bis(4-aminocyclohexyl)methane isomer mixtures that are liquid at 25° C. with isophthalic acid or an amide-forming derivative thereof, at a temperature of 100° C. to 350° C.

Referring to the formula given for the bis(4-aminocyclohexyl)methane it can be seen that stereoisomers arise from the different possible relationships of the bonds of the carbons attached to the bridge methylene and the carbons attached to the amino groups with respect to the cyclohexyl ring (i. e., the cis and trans configurations of the carbon-hydrogen bonds of those carbons in the above formula which have only one hydrogen). The three expected isomers differ in physical properties, particularly in melting points. The above diamine is obtained as a mixture of isomers by hydrogenation of di(p-aminophenyl)methane. This latter compound results from the reaction of formaldehyde with aniline. Depending upon the choice of conditions for the hydrogenation either a mixture of stereoisomers is obtained that is liquid at 25° C., i. e., normally liquid, or a mixture is obtained that is solid at 25° C., i. e., normally solid, the latter mixture generally melting above 40° C.

The preparation and properties of the normally liquid mixture of stereoisomers of di(p-aminocyclohexyl)methane are fully disclosed in U. S. application Serial No. 98,174, filed June 9, 1949 in the name of G. M. Whitman and now Patent Number 2,606,924. In general, the preparation of normally liquid mixtures of stereoisomers is favored by the use of a ruthenium hydrogenation catalyst at relatively low temperatures whereas higher temperatures and other hydrogenation catalysts favor the production of the higher melting normally solid mixtures of stereoisomers of di(p-aminocyclohexyl)methane.

The properties of the new polyamide of this invention are quite unexpected and were unpredictable. As shown in U. S. 2,516,585, terephthalic acid gave with the liquid isomer mixture, di(p-aminocyclohexyl)methane, an opaque polymer which was infusible at temperatures as high as 330° C. and hence unsuitable for fiber and plastic applications. Phthalic acid under amide-forming conditions condenses to give low molecular weight brittle products, of which the major proportion is the monomeric substituted phthalimide. In contrast to experience with these isomers of phthalic acid it is surprising that the meta isomer, isophthalic acid, gives with the same diamine a transparent polyamide which is thermoplastic, retains its stiffness and molded dimensions at temperatures of at least 200° C.

The following examples in which the parts are by weight illustrate specific embodiments of this invention.

*Example 1.*—To 297.2 parts of bis(4-aminocyclohexyl)methane, which is a mixture of isomers that is liquid at 25° C. (obtained by the hydrogenation of di)p-aminophenyl)methane with ruthenium catalyst at 100–120° C.), in a glass-lined pressure-resistant reactor was added 449.7 parts of diphenyl isophthalate. The reactor was purged with oxygen-free nitrogen and heated for five minutes at 255° C. under nitrogen at a pressure of one atmosphere. Heating under nitrogen was continued at 306° C. for fifteen minutes and at 330° C. for fifteen minutes while phenol liberated from the reaction was distilled. The reaction was completed in fifteen minutes at 330° C. under a pressure of 5 mm. of mercury. The polymer had an inherent viscosity of 1.12 (the 1n relative viscosity of an 0.5% solution in m-cresol at 25° C. divided by 0.5). Transparent colorless films were obtained by heating this polymer under a pressure of 2–3000 lb./sq. in. at 330° C. The film had a stiffness of 370,000 lb./sq. in. at 25° C. and 50% relative humidity and 350,000 lb./sq. in. after soaking in water at 25° C. for seventy-two hours. The film had a stiffness of 210,000 lb./sq. in. at 200° C. These films retained their original dimensions and optical clarity after exposure to boiling water for several days. The polymer had a water absorption to saturation of 7.75%.

*Example 2.*—To 882 parts of bis(4-aminocyclohexyl)methane, described in Example 1, in a glass-lined, pressure-resistant reactor was added 696.5 parts of isophthalic acid and 1000 parts of phenol. The reactor was purged with oxygen-free nitrogen, sealed and heated for one hour at 210° C. under autogenous pressure. The reactor was opened and the contents heated at reflux for one-half hour under nitrogen at one atmosphere pressure. The reactor was then heated one hour at 285° C. while phenol and water from the condensation reaction distilled. Heating was continued for two hours at 285° C. and one-half hour at 306° C. under a pressure of 5 mm. of mercury. Colorless, transparent polymer was obtained which has an inherent viscosity of 0.89.

*Example 3.*—To 207.5 parts of bis(4-aminocyclohexyl)methane described in Example 1, mixed with 200 parts of boiling water was added 163.9 parts of isophthalic acid. The mixture was boiled for three minutes and filtered. To the filtrate was added 3500 parts of absolute ethyl alcohol. The mixture was cooled to 20° C. and in 48 hours salt amounting to 200 parts was separated by filtration. Fifty parts of this salt was polymerized with 50 parts of phenol in a way similar to that described in Example 2. Polymer with an inherent viscosity of 0.85 was obtained.

The examples show the equivalence of isophthalic acid and its esters in the amide-forming reaction. In carrying out the polyamide-forming reaction isophthalic acid or its suitable amide-forming derivatives is heated with a normally liquid mixture of bis(4-aminocyclohexyl)methane in substantially molar amounts, that is, in molar ratios that do not depart more than about 0.5% from equimolecular amounts. A very slight excess of one of the reactants can be present to control molecular weights within desired limits. Optimum rates of polymerization are obtained by heating the amide-forming ingredients to at least 200° C. and below 350° C., and preferably in the range of 250–330° C., although, as noted hereinabove, the polymerization takes place at temperatures as low as 100° C., or even lower. The heating is generally under an inert atmosphere.

Although up to about 5% of other polyamide-forming materials may be present, the optimum properties are obtained with the diamine and dibasic acid as shown in the examples.

The polyamide of this invention has an inherent viscosity of at least 0.4 and generally at least 0.6, and loses rigidity of molded objects at a temperature that approaches the melting point of the polyamide. This high a softening point, that is, 200° C. or higher, is rare in thermoplastics and even exceeds the distortion temperature of many thermosetting resins. In addition to this unusual and unexpected property the polymer is substantially unaffected by boiling water, even after several days' exposure. The polymer possesses superior stiffness, is transparent, and is easy to mold or extrude. This novel combination of properties makes the polyamide useful in the preparation of molded objects, bristles, and fibers. Particularly important are uses where rigidity at elevated temperature is required, such as for electrical applications or in bristle applications where the bristle is subjected to superheated steam.

I claim:

1. A process for making a transparent polyamide which comprises heating, in a molar ratio which is within 0.5% of equimolar amounts, a mixture of isomeric bis(4-aminocyclohexyl)methanes which is liquid at 25° C., and an isophthalic acid compound of the class consisting of isophthalic acid and amide-forming derivatives thereof, at a temperature of from 100° C. to 350° C. whereby a transparent polyamide in which the polyamide-forming ingredients consist essentially of the said isophthalic acid compound and the said isomeric bis(4-aminocyclohexyl)methanes is obtained.

2. The process set forth in claim 1 in which the said temperature is from 250° to 350° C.

3. The transparent polyamide, obtained according to the process of claim 1, which consists, in major amount, of recurring structural units of the formula

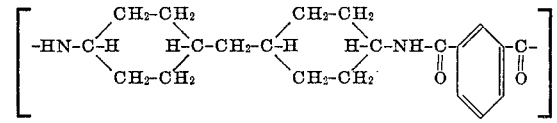

References Cited in the file of this patent

UNITED STATES PATENTS

| Number | Name | Date |
|---|---|---|
| 2,244,192 | Flory | June 3, 1941 |
| 2,252,554 | Carothers | Aug. 12, 1941 |
| 2,512,606 | Bolton et al. | June 27, 1950 |
| 2,516,585 | Pease | July 25, 1950 |
| 2,606,924 | Whitman | Aug. 12, 1952 |